United States Patent Office 2,928,279
Patented Mar. 15, 1960

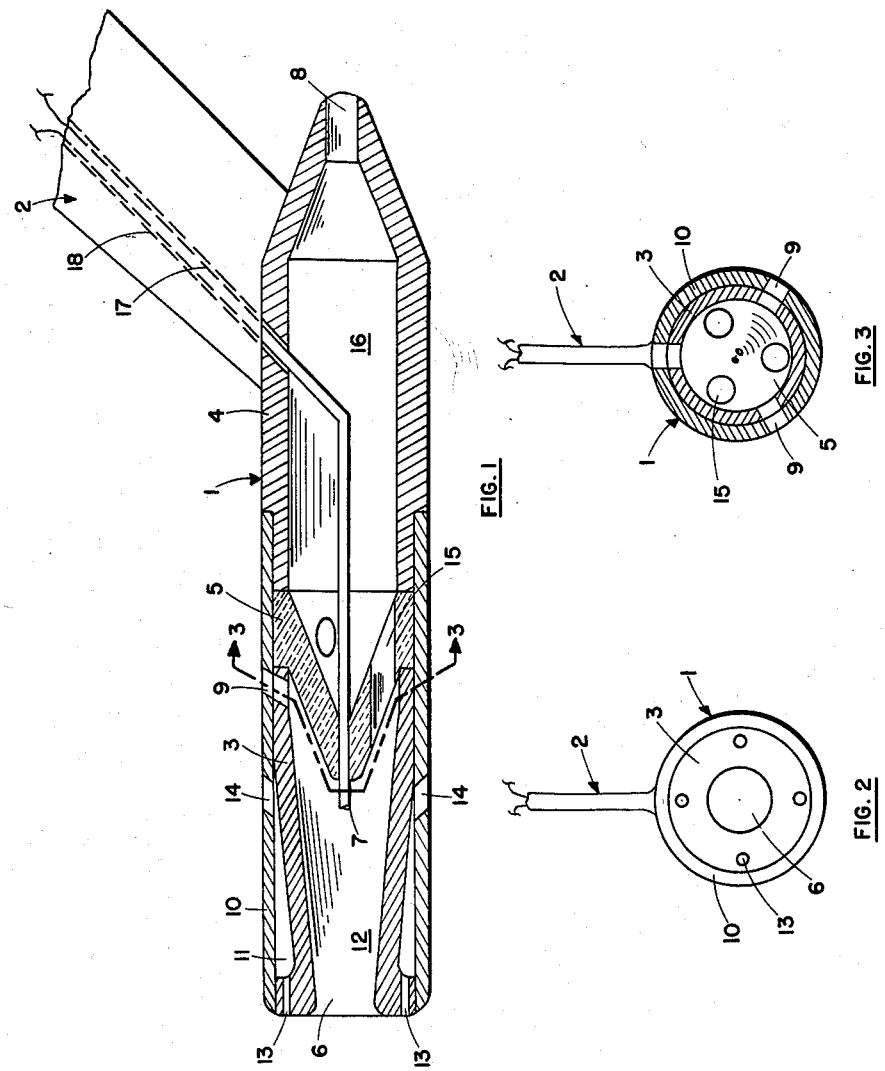

2,928,279

STAGNATION AIR TEMPERATURE MEASURING DEVICE

Marvin V. Schober, Fullerton, Calif., assignor to North American Aviation, Inc.

Application September 1, 1955, Serial No. 532,068

2 Claims. (Cl. 73—349)

This invention relates to temperature measuring devices, and particularly to a stagnation air temperature measuring device utilized to measure ambient air temperatures of an air stream during the flight of a high velocity aircraft at subsonic as well as supersonic speeds.

The ambient air temperature is an important factor in aerodynamic calculations. Ambient air temperature may be defined as the free air temperature of the air stream at the altitude and position of the aircraft. An accurate knowledge of the temperature of the undisturbed air stream during flight is required for determination of the true air density employed in calculating the true air speed of the aircraft. In the past, it has been difficult to measure the true temperature of the undisturbed air during flight because a temperature measuring device arranged in the free air stream measures not only the ambient air temperature but also a variable component of temperature resulting from the adiabatic compression caused by the slowing down or stopping of the air at the measuring device. Further, certain errors are introduced in the measurement due to the sun's radiation and also due to heat conduction from comparatively large masses or heat sinks in the vicinity of the temperature measuring device.

A device which recovers only a portion of the adiabatic temperature rise is unsatisfactory owing to the fact that corrections for the partial rise in temperature is a complicated process. All the air passing the aircraft is subjected to a small temperature rise and at increased air speeds this rise becomes greater, complicating the determination of the actual total air temperature. Total air temperature may be defined as the ambient air temperature plus the full adiabatic temperature rise. If the temperature measuring device recovers only a fraction of the total temperature, it recovers only a fraction of the change in temperature due to the presence of the aircraft. Furthermore, an instrument that recovers only a portion of the total temperature must be located in the air stream at a point where the local velocity is known for all air speeds, and elaborate corrections must be made in order to obtain data that is useful.

It is therefore an object of this invention to provide an improved stagnation air temperature measuring device useful for producing an instantaneous measurement of the true total air temperature.

It is another object of this invention to provide an improved air temperature measuring device for use on aircraft that is capable of measuring or sensing the total air temperature.

It is a further object of this invention to provide an improved stagnation air temperature measuring device utilizing a thin cylindrical shell having an inlet port facing forwardly in the air stream and an outlet port facing rearwardly in the air stream, the ratio of the cross-section areas of said inlet and outlet ports being selected to bring the air entering said cylindrical shell substantially to a stop, and temperature measuring means positioned within said cylindrical shell and having an output which is a predetermined function of the temperature of the air within said shell.

Other objects of invention will become apparent from the following description taken in connection with the accompanying drawings, in which Fig. 1 is a view, partly in section, of a preferred embodiment of the stagnation air temperature measuring device contemplated by this invention;

Fig. 2 is a front view of the temperature measuring device of Fig. 1;

And Fig. 3 is a section view of the temperature measuring device of Fig. 1 taken along the line 3—3.

Referring now to Fig. 1, stagnation air temperature probe 1 is supported from an aircraft (not shown) by support 2. Stagnation air temperature probe 1 consists of a thin cylindrical shell having nose section 3, a tail section 4 and a thermocouple support 5. Nose section 3 is an elongated tubular port preferably formed of stainless steel. Nose section 3 has a central longitudinal opening 6 of Venturi form having a forward divergent mouth, a smooth gradual restriction adjacent to the mouth, and a rearwardly divergent portion continuing inwardly from the restriction. Thermocouple temperature measuring device 7 is positioned to measure the temperature of the air at the rear portion of nose section 3. As will be explained later, the air at this point is brought substantially at rest due to the relative cross-section areas of inlet 6 and outlets 8 and 9. A thin, stainless steel wall 10 is attached to nose section 3 in a manner to form insulating chamber 11. Insulating chamber 11 provides a high degree of insulation of chamber 12 of nose section 3 from any external sources of radiation, such as sun rays. Inlet and outlet ports 13 and 14, respectively, are provided to continuously subject insulating chamber 11 to a flow of air from the air stream to prevent the formation of a stagnant air, heat sink in chamber 11.

Thermocouple support 5 is provided to rigidly support thermocouple 7 in chamber 12. Support 5 is preferably constructed of a very poor heat conducting material, such as unfired lava. A plurality of axial holes 15 are provided in support 5 to permit the free axial movement of the air from chamber 12 into chamber 16. A plurality of peripheral bleeder holes 9 are at the rear end of chamber 12 to bleed-off any stagnant air from the rear of chamber 12, thereby preventing the formation of a heat sink. Most of the air entering inlet opening 6, however, passes through holes 15 in support 5 and leaves the temperature probe through outlet port 8. It is to be noted that outlet port 8 faces rearwardly in the air stream and is therefore substantially unaffected by the passage of air at varying rates of speed over the sides of the probe.

In operation, air enters the probe through inlet port 6 positioned to face forward in the air stream and impinges on thermocouple junction 7. As is well known in the field of fluid dynamics, the layer of air immediately adjacent a moving surface forms a boundary layer condition. For most accurate results, the size of the inlet port 6 should therefore be of sufficient size so as to minimize interference of the air flow due to molecular friction forces caused by the boundary layer. This air is brought from a relative supersonic flow to a flow of essentially zero velocity relative to probe 1 by the action of nose section 3 and in doing so converts its kinetic energy to thermal energy. The total air temperature including the component due to the kinetic energy of the air is detected by thermocouple 7. Thermocouple leads 17 carry the increase in potential due to this temperature of the air through drilled hole 18 of support 2 to suitable instrumentation (not shown), where it is measured and converted to a temperature indication. The nose section 3 acts as a diffuser section for the air stream and also provides the inner boundary in the insulation chamber 11.

As noted previously, a small amount of air flows through chamber 11 via inlet ports 13 and outlet ports 14. Insulation chamber 11 lowers radiation losses from the thermocouple junction 7 and also prevents radiation to junction 7 from the sun. Radiation is further reduced by highly polishing the inner surface of nose section 3. Peripheral holes 9, communicating chamber 12 to the outside, allow the escape of air to prevent a stagnant pool of air around thermocouple 7 which would tend to increase the time response of the temperature probe. Tail section 4 is hollow to further reduce the mass and also to prevent it from becoming a heat sink or source of heat supply.

A double scale drawing of a typical embodiment of the stagnation air temperature measuring device contemplated by this invention is shown in Fig. 1. The over-all length of probe 1 is 3⅝ inch with an outside diameter of ⅝ inch. The largest diameter of chambers 12 and 16 is .437 inch. Nose section 3 is constructed with a 5 degree taper with respect to the center line of the probe terminating in ¼ inch-diameter, forward opening 6. Radial holes 9, drilled at the 60 degree slope with respect to the center line, are three, equispaced .101 inch holes. Unfired lava plug 5 is provided with three, equispaced .101 inch holes centered about and parallel to the center line, as is more clearly shown in Fig. 3. End section 4 is provided with a 22½ degree tapered portion with respect to the center line, terminating in .136 inch diameter near opening 8. Thus, the inlet port facing forwardly in the air stream has an area of approximately 0.050 square inch, the outlet port facing rearwardly in the air stream has an area of approximately 0.015 square inch and the aggregate area of the radial outlet ports is approximately .025 square inch.

A stagnation temperature probe constructed with the above dimensions has been constructed and tested. It has been established as a result of these tests that this probe has a high degree of accuracy in measuring the total air temperature at subsonic as well as supersonic rates of air flow. It has further been found that the probe constructed in accordance with this invention has greatly improved response time over any other temperature probes which have been constructed in the past. Response time is defined as the length of time required for the probe to respond to a change in the total air temperature. Past probes have had response times of four minutes or more. The probe constructed as described above has a response of a few seconds.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A stagnation air temperature measuring device having a very short response time for measuring the total air temperature of a high speed air stream comprising a hollow cylindrical body having an axial chamber with inlet port means at one end of said cylindrical body facing forwardly in said air stream, a plurality of peripherally located spaced outlet ports in a radial direction, and an outlet port at the other end of said cylindrical body facing rearwardly in said air stream, the ratio of the areas of said inlet port to said radial outlet ports to said rear outlet port being about 10 to 5 to 3, said ratio of areas insuring that the air entering said inner chamber through said inlet opening is brought substantially to rest, a support member extending across said axial chamber and fixed within said body and having an opening formed therein to permit the free axial movement of the air between said inlet port means and said rear outlet port, and a temperature sensitive device mounted on said support member whereby said temperature sensitive device is located in said chamber at the position wherein the air is substantially at rest.

2. A stagnation air temperature measuring device for use in measuring the temperature of an air stream comprising an elongated thin-walled hollow cylindrical body having a main air stream inlet port means of Venturi form at one end of said cylindrical body facing forwardly in said air stream, an inner chamber, a plurality of spaced air outlet openings in the periphery of said chamber, and a main air outlet opening at the other end of said cylindrical body facing rearwardly in said air stream, the cross-section areas of said inlet and outlet openings being so related in capacity to insure the air entering said inner chamber through said inlet opening is brought substantially to rest, a support member extending across said axial chamber and fixed within said body and having an opening formed therein to permit the free axial movement of the air between said inlet port means and said main air outlet opening and a device mounted on said support member whereby said device is located in said inner chamber at the position wherein the air is substantially at rest, said device having an output which is a predetermined function of the instantaneous temperature of the air in said chamber.

References Cited in the file of this patent

UNITED STATES PATENTS

| | | |
|---|---|---|
| 2,414,370 | Floyd | Jan. 14, 1947 |
| 2,536,037 | Clousing | Jan. 2, 1951 |
| 2,588,840 | Howland | Mar. 11, 1952 |
| 2,798,893 | Winkler | July 9, 1957 |

OTHER REFERENCES

A. Franz in N.A.C.A. Technical Memorandum No. 953, September, 1940 (8 pages).

W. J. King in Trans. of A.S.M.E., volume 65, No. 5 July, 1943, pages 421–431.